United States Patent

Gorny et al.

[11] Patent Number: 5,369,582
[45] Date of Patent: Nov. 29, 1994

[54] SYSTEM FOR CONTROL OF A VEHICLE CHASSIS

[75] Inventors: Stefan Gorny, Schwieberdingen; Rainer Kallenbach, Waiblingen-Neustadt; Andreas Klug, Stuttgart; Udo Neumann, Leonberg; Stefan Otterbein, Stuttgart, all of Germany

[73] Assignee: Robert Bosch GmbH, Stuttgart, Germany

[21] Appl. No.: 851,919

[22] Filed: Mar. 16, 1992

[30] Foreign Application Priority Data

Apr. 12, 1991 [DE] Germany ............... 4112005

[51] Int. Cl.$^5$ ............... B60G 17/00
[52] U.S. Cl. ............... 364/424.05; 364/424.01; 280/688; 280/707
[58] Field of Search ............... 364/424.05, 424.01, 364/424.03, 431.08; 280/688, 693, 702, 707

[56] References Cited

U.S. PATENT DOCUMENTS

| | | | |
|---|---|---|---|
| 4,936,425 | 6/1990 | Boone et al. | 188/299 |
| 5,088,761 | 2/1992 | Takehara et al. | 280/707 |
| 5,090,728 | 2/1992 | Yokoya et al. | 280/707 |
| 5,127,667 | 7/1992 | Okuda et al. | 280/707 |
| 5,138,554 | 8/1992 | Wada | 364/424.05 |
| 5,142,475 | 8/1992 | Matsunaga et al. | 364/424.05 |
| 5,162,995 | 11/1992 | Ikemoto et al. | 364/424.05 |
| 5,173,858 | 12/1992 | Wada et al. | 364/424.05 |
| 5,218,546 | 6/1993 | Bradshaw et al. | 364/424.05 |

FOREIGN PATENT DOCUMENTS

| | | |
|---|---|---|
| 3810638 | 10/1989 | Germany . |
| 4107090 | 10/1991 | Germany . |
| 60-261716 | 12/1985 | Japan . |
| 1485003 | 9/1977 | United Kingdom . |
| 0162449 | 11/1985 | United Kingdom . |
| 0239831 | 10/1987 | United Kingdom . |
| 0335016 | 10/1989 | United Kingdom . |

OTHER PUBLICATIONS

Article from Vehicle System Dynamics 11 (1982), pp. 31–42, author Donald L. Margolis, titled—Semi-Active Heave and Pitch Control for Ground Vehicles.

*Primary Examiner*—Thomas G. Black
*Assistant Examiner*—Stephen J. Walder, Jr.
*Attorney, Agent, or Firm*—Baker & Daniels

[57] ABSTRACT

A system for changing the damping characteristics of shock absorbers, based on the signals (Xar'(t)) of the relative movements such as the spring deflection velocity, between the vehicle superstructure and wheels, additional signals (Xar''(t)), such as the spring deflection acceleration, are determined. The two signals are logical linked so that the control of a vehicle variable, such as the activation of adjustably designed shock absorbers, is carried out. This makes it possible to change the characteristic of the shock absorber in operating phases of low damping forces of the shock absorber. This feature optionally reduces noise at damping characteristic changes.

6 Claims, 2 Drawing Sheets

SYSTEM FOR CONTROL OF A VEHICLE CHASSIS

BACKGROUND OF THE INVENTION

The invention relates a system for generating a signal on a vehicle, specifically in conjunction with an undercarriage control.

An efficient suspension system between the wheel units and the vehicle superstructure is essential for the design of the undercarriage of a motor vehicle. In the case of a semiactive system, such a suspension system consists generally of a spring arrangement having a fixed spring characteristic with which a shock absorber device with adjustable damping is arranged in parallel thereto. Such a shock absorber with an adjustable characteristic may be realized in such a way that the shock absorber system is equipped with a flow control valve whose cross sectional flow is variable.

Furthermore, an efficient process for the control or regulation of the adjustable suspension system is of great importance for the design of such an undercarriage. Such a process, based on information from sensor signals which apprise the state of travel of the vehicle, provides activation signals for the adjustable suspension systems.

An efficient undercarriage regulation or control should ideally regulate or control the adjustable undercarriage in such a way that, for one, it allows for road safety and, for another, enables maximum travel comfort for the passengers and/or a vehicle cargo that is sensitive to shocks. From the aspect of the suspension and/or shock absorber system, these are conflicting objectives. High travel comfort can be achieved through a maximally soft undercarriage adjustment, whereas with regard to high road safety, a maximally hard undercarriage adjustment is desirable.

Previously known from DE-OS 39 18 735 is a process for damping sequences of motion on undercarriages of passenger cars and trucks. Here, the activation signals for control or regulation of the adjustable undercarriage are essentially generated by the processing of sensor signals through filter setups. These filters are so conceived that the sensor signals which apprise the travel state of the vehicle will be influenced in their amplitude and/or phase development. This influencing generates activation signals for the adjustable undercarriage, thereby effecting an adaptation to the respective state of movement of the vehicle in such a way that in critical travel situations an undercarriage adjustment serving the road safety mode will be brought about while in uncritical travel situations an adjustment for comfort will be made.

An undercarriage comfort adjustment can be accomplished in that the adjustable undercarriage is adjusted maximally soft, i.e., such that the adjustable shock absorbers exercise a slight damping. A far more efficient control or regulation of the undercarriage, for example in view of the movements of the vehicle superstructure that determine travel comfort, can be accomplished through a so-called frequency-dependent "skyhook regulation."

With the so-called skyhook regulation, the superstructure movements are reduced so as to bring about an improvement of the travel comfort, whereas the road safety is not directly increased. Generally known in undercarriage control, this concept of regulation is based on the model concept of a shock absorber and/or suspension system that attaches to the mass of the vehicle superstructure and is connected to an inertial fix point (skyhook). Such an inertial shock absorber and/or suspension system not being directly realizable in practice, is by way of substitution, appropriately activated between the vehicle superstructure and the wheel units.

There is known from a number of publications (Crolla, D. A., Aboul Nour, A.M.A., Proceedings of the Institution of Mechanical Engineers, International Conference of Advanced Suspension, Oct. 22–25, 1988, London or Magolis, D. L., Semi-Active Heave and Pitch Control for Ground Vehicles, Vehicle System Dynamics, 11 (1982), pp. 31–42), in the case of a suspension system featuring shock absorbers whose damping characteristic is adjustable in two stages (hard/soft), "semiactive, discrete skyhook damping" which is a switching strategy wherein the damping characteristic is adjusted contingent on superstructure movements. This strategy is presented in the following table:

|  | Shock absorber in pull state | Shock absorber in push state |
|---|---|---|
| $Va > Vagr$ | hard | soft |
| $Va < -Vagr$ | soft | hard |

Here, the superstructure velocity in the vertical direction, at the points of attack of the suspension system, is abbreviated as $Va$. Once this velocity exceeds a certain positive bound $Vagr$ (tuning parameter), i.e., as an impetuous upward movement of the car body is taking place, the respective shock absorber is switched in the pull state to the hard characteristic, and in the push state to the soft characteristic. Conversely, an impetuous down movement of the superstructure causes in the pull stage, a changeover to the soft and in the push stage to the hard characteristic. In the absence of excessive superstructure movements ($|Va| \leq Vagr$) the shock absorber operates in its soft tuning mode, both in the pull and the push stage.

Shock absorbers that are adjustable in their damping characteristic are described in DE-OS 33 04 815 and DE-OS 36 44 447.

Furthermore, thoughts concerning the road safety are relevant as criteria for adjustment of the damping characteristic. Geared to minimizing the dynamic wheel load fluctuations, such a system has been described in the German patent application P 40 11 808.8.

Such undercarriage regulation systems provide control signals for the adjustment of the shock absorber damping characteristic contingent upon the state of travel of the vehicle.

U.S. Pat. No. 4,936,925 proposes an undercarriage regulation system wherein a changeover of a semiactive shock absorber is to take place between a hard and a soft damping stage whenever the relative velocity of the two points of attack of the shock absorbers is less than a fixedly predetermined thresh-old or the tire deformation is smaller than a fixedly predetermined thresh-old, depending on which of the two conditions of changeover is first met. As will be shown hereinbelow, such an activation contingent on shock absorber piston velocity is not optimal. Even when additionally allowing for the tire deformation as a criterion for the changeover of the damper characteristic, an optimal mode of activation is not obtained, as will be described hereinbelow. Furthermore, allowing for the tire deformation requires a considerable expense with regard to the sensor engineering needed.

The problem underlying the present invention, based on these activation signals, is to optimize the mode of activation of the shock absorbers.

SUMMARY OF THE INVENTION

In the case of the present inventional, optimized mode of activation, adjustments of the damping characteristic take place in the operational phases of low damping forces of the shock absorber.

These operational phases are generally in the range of reversals of the shock absorber piston travel. A changeover in these operational phases is favorable in view of noise optimization, since shock absorber switching noise occurs mostly as the shock absorber is changed over to a higher internal differential pressure.

Favorable, furthermore, is a changeover in the range of the reversal points of the shock absorber piston travel in the sense of the theorem of the discrete semiactive skyhook regulation.

Practice shows, however, that measuring the shock absorber velocity and changing the shock absorber over at the change of its mathematical sign is insufficient. The reasons are these:

1. From the physical zero point passage of the shock absorber piston velocity up to its recognition, up to a scanning cycle can pass.
2. From the moment of recognizing a mathematical sign change of the shock absorber piston velocity up to the completed changeover to the new damping characteristic on the shock absorber, approximately one regulating cycle passes with customary scanning regulators.
3. The valve, which is responsible in the shock absorber for the change of the damping characteristic, is always affected by dead time and dynamics. That is, a finite period of time lies between the valve activation and the change of shock absorber force.
4. Real signals are always noise-afflicted. Therefore, only blurred information is available on the actually prevailing shock absorber piston velocity.
5. At low shock absorber piston velocity (travel on a nearly flat road) its mathematical sign changes at a random high frequency. Allowing for the noise problems indicated under item 4, damage to the actuating device, through high-frequency activations might occur.

Another advantage of the inventional system is constituted by avoiding a late change of the damping characteristic (long after the absorber piston velocity has passed through the zero point; above items 1 through 3) and by suppressing a random switching back and forth at low shock absorber piston velocities (items 4 and 5).

To that end, the signals $Xar'(t)$ representing the relative movements of the two ends of the shock absorber at the time (t), are captured and transmitted to first means 12. These are provided to receive a signal value $Xarp'(t)$ which depends on the signals $Xar''(t)$. These two signals, representing for instance the shock absorber piston velocity and the shock absorber piston acceleration computed from the shock absorber piston velocity, are logically linked with one another in the second means 13. Due to these logical linkages and threshold interrogations, a vehicle variable, such as the activation signal of a shock absorber, is now prompted.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
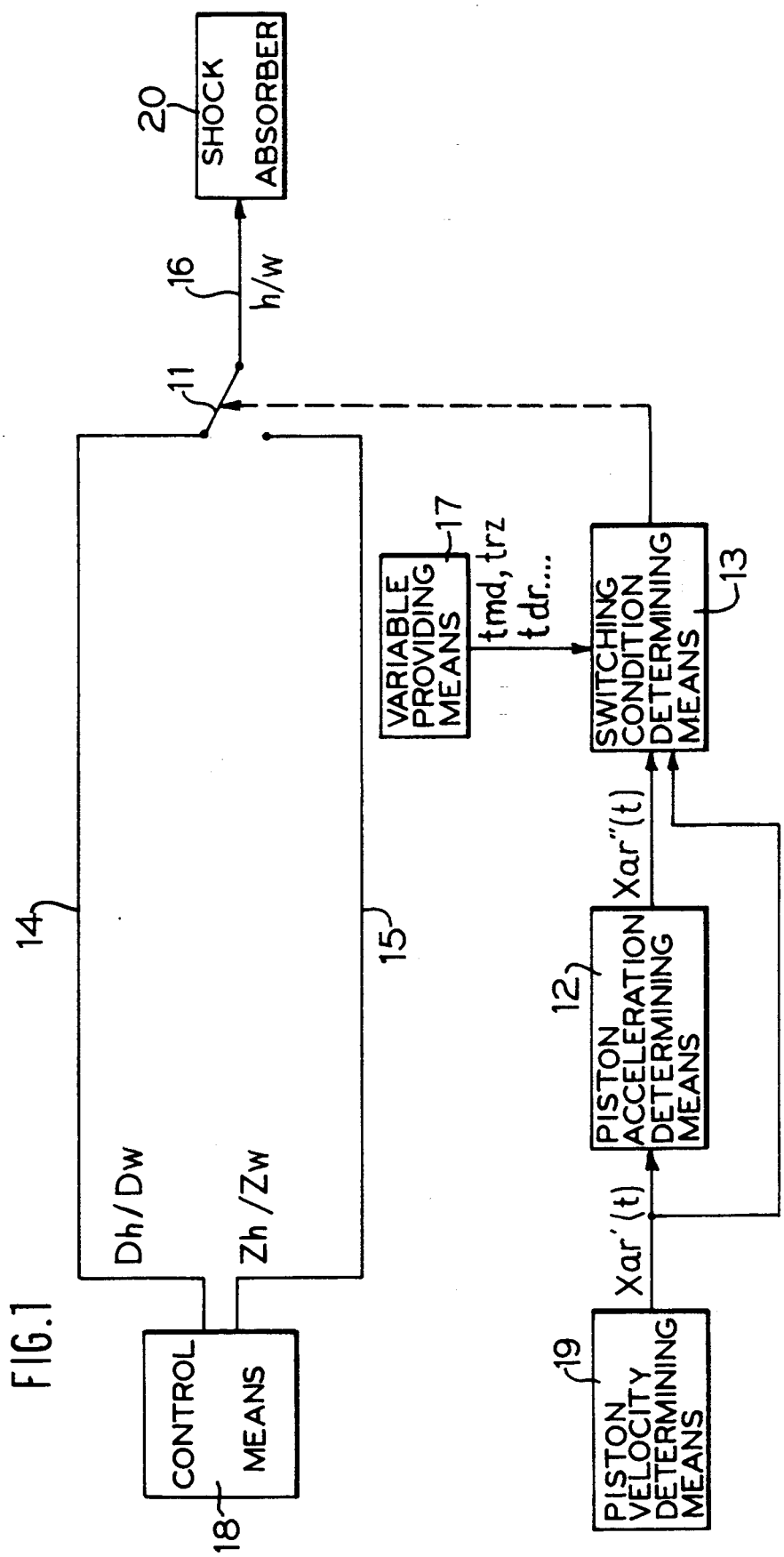
FIG. 1 shows a block diagram of the inventional system.

Corresponding reference characters indicate corresponding parts throughout the several views. The exemplifications set out herein illustrate a preferred embodiment of the invention, in one form thereof, and such exemplifications are not to be construed as limiting the scope of the invention in any manner.

DESCRIPTION OF THE PREFERRED EMBODIMENT

The system according to the invention will be illustrated in exemplary fashion in this embodiment with the aid of the drawings.

FIG. 1 shows in the upper portion, two signal paths 14 and 15 with the signals Dh/Dw and Zh/Zw emanating from and based on means 18. The two signal paths can be coupled, by means of the controllable switch 11, to the signal path 16 carrying the signal h/w to a shock absorber 20. In the lower part of FIG. 1, the output signal $Xar'(t)$ of means 19 is transmitted to first means 12. Prevailing on the output side of first means 12 is the signal $Xarp''(t)$, which is passed on to second means 13. Furthermore, the signal $Xar'(t)$ is transmitted to second means 13. On the output side of second means 13, an activation signal for activation of the controllable switch 11 prevails. Transmitted to second means 13, by means 17, are the variables tmd, trz, and tdr.

The overall delay time, tau, for a change of the damping characteristic in the shock absorber piston velocity zero point (Vd=0) is essentially composed of three parts:

1. A value, tmd, which by magnitude is known only approximately and is contingent on the time-discrete measured data acquisition.
2. A value, trz, of constant magnitude, depending on the regulator cycle time.
3. A value, tdr, dependent on shock absorber hardware, contingent for instance on the shock absorber dynamics.

Additionally, the overall delay time tau may be influenced by further variables, such as the shock absorber piston velocity itself.

$$tau = tmd + trz + tdr \quad (1)$$

In the following, the time derivations of the variables are marked "'", so that $Xar'(t)$ represents, the first time derivation and $Xar''(t)$ the second time derivation of the variable $Xar(t)$.

When developing the measured shock absorber piston velocity at every point in time t into a Taylor series $$Xar'(t+tau) = [Xar'(t)] + [Xar''(t)*tau] + [\tfrac{1}{2}*Xar'''\Delta(t)*tau^2] + \ldots \quad (2)$$

and aborting it after the second member (since the higher derivations cost computation time and their signal quality deteriorates rapidly), a linearly extrapolated estimate value for the absorber piston velocity is obtained in tau seconds. If this estimate is zero or changes its mathematical sign between two regulation cycles, a zero passage of the actually prevailing shock absorber piston velocity is to be expected in tau seconds. The value Xar'(t+tau) shown above is not used as a preview signal for shock absorber switching though, since it would only aggravate the noise problem described above. It is more advantageous to compare the actually measured velocity with the second member of the Taylor series (calculated new in each cycle of computation). Following from $$0 = Xar'(t) + ]Xar''(t)*tau] \quad (3)$$

is the interrogation $$Xar'(t) < |]Xar''(t)*tau]| \quad (3')$$

if the shock absorber, prior to meeting condition (3'), was in the traction stage, and $$Xar'(t) > -]Xar''(t)*tau]| \quad (3''),$$

if the shock absorber, prior to meeting condition (3"), was in the compression stage.

If the measured velocity Xar'(t) passes for the time the limit given by the amount of the product from shock absorber piston acceleration Xar"(t) and delay time tau on the traction side, respectively the limit given by the negative value of this amount on the compression side, an operating phase relevant to switching the damping characteristic is on hand.

Illustrated in FIG. 1 as a block diagram, this embodiment bases in means 18 a discrete, semiactive skyhook regulation. The changeover of the damping characteristic is effected in two stages, i.e., the shock absorbers designed to be variable in their damping characteristic feature a hard and a soft adjustment. But the inventional system is not limited to the mode of activation of such dual stage shock absorbers, since the problem underlying the inventional system, especially in view of noise optimization at changeover processes, is solved also in the case of multiple stage adjustable shock absorbers by the present inventional system. Furthermore, the present inventional system is not limited to a specific strategy of regulation, but any adjustment requirements on the shock absorbers can, according to the present invention, be influenced in time respects.

For the purpose of this application, where any form of the term "control" is used, such as "control" "controller", or "controlling", it is to be understood that such term includes the meaning of the term "regulation", i.e., such "control" may or may not include a feedback loop.

As described in the introduction, the discrete semiactive skyhook strategy of regulation procedure using shock absorbers that are adjustable in two stages is such that, depending on the movement of the superstructure, there will be a compression stage request or a traction stage request for changeover of the damping characteristic of the shock absorber at the point of attack of the shock absorbers. If the shock absorber is in its traction stage (Xar', positive by convention) and the vertical superstructure movement is "fast upward," that is, away from the road surface, the shock absorber needs to be changed over to hard so as to counteract the superstructure movement. If the shock absorber is in the compression stage during these superstructure movements ("fast forward"), the shock absorber needs to be changed over to soft for minimization of the superstructure movements. The traction stage demand in this case (superstructure movements "fast upward") is thus for hard (signal Zh) while the compression stage demand is for soft (signal Dw). Analogous considerations apply to the opposite superstructure movements (refer also to the table in the introduction to the specification). These compression or traction stage demands are indicated in FIG. 1 by the signal paths 14 and 15. Carrying the compression stage demand information from the actual skyhook regulation means 18, the signal path 14 features either the signal Dh (compression stage hard) or the signal Dw (compression stage soft). Carrying the traction stage demand information from the actual skyhook regulation means 18 the signal path 15 either features the signal Zh (traction stage hard) or the signal Zw (traction stage soft). Both signal paths 14 and 15 are connected with the signal path 16 by the controllable switch 11. The signal path 16 transmits the activation signal "hard" or "soft" to the shock absorber 20.

In means 19, the shock absorber piston velocity is determined by the signal Xar'(t) representing the spring deflection velocity. This can be accomplished in that signals from suitable sensors that capture the spring deflection movements, such as the spring deflection travel and/or the spring deflection velocity of the undercarriage and/or the pressure in the shock absorber, are appropriately processed. If the shock absorber is operationally directly connected for instance with its one end to the vehicle superstructure and with its other end to the wheel unit, the spring deflection velocity or the differentiated spring deflection travel represents for instance the shock absorber piston velocity. If the shock absorbers are not directly connected with the wheel, respectively with the superstructure, sensors indicating the pressure differences in the shock absorber for instance provide a measure of the shock absorber piston velocity.

The switching conditions for the controllable switch 11 are determined (derived) by means 12 and 13. The first means 12 determines from the signal Xar'(t) the pertaining signal value Xarp"(t), with Xar'(t) representing the shock absorber piston velocity, and Xarp"(t) the pertaining shock absorber piston acceleration. Thus, first means 12 is characterized by their differentiating transfer performance.

The first means 12, and also the other means of the inventional system characterized by their transfer properties, may be realized in electronic-digital fashion, for example by processing in computer units a differential equation representing the transfer properties, or in electronic-analog fashion, for instance by simulation with electronic components of a differential equation representing the transfer properties. Furthermore, a computer-controlled design is possible.

In the second means 13, the signal Xar'(t) is linked with the pertaining signal value Xar"(t) according to equation 3'. For computing the value tau according to equation 1, the variables tmd, trz and tdr described in more detail above are transmitted by means 17, along with further signals, to the second means 13. These variables may assume constant values or, for instance, may depend on the state of travel or may be adapted, as tuning parameters, to the remaining components of the adjustable undercarriage.

Obtained by interrogation according to equation 3', in the second means 13, is a switch band VSB1=[−|Xar″*tau|; |Xar″*tau|].If, in capturing the shock absorber piston velocity, the values Xar′ are within the switch band VSB1 for the first time, and the shock absorber piston velocity passes for the first time the switch band VSB1, then either the compression stage demand (signal path 14) or the traction stage demand (signal path 15) is relayed to the shock absorber through activations of the switch 11.

Figure 2:
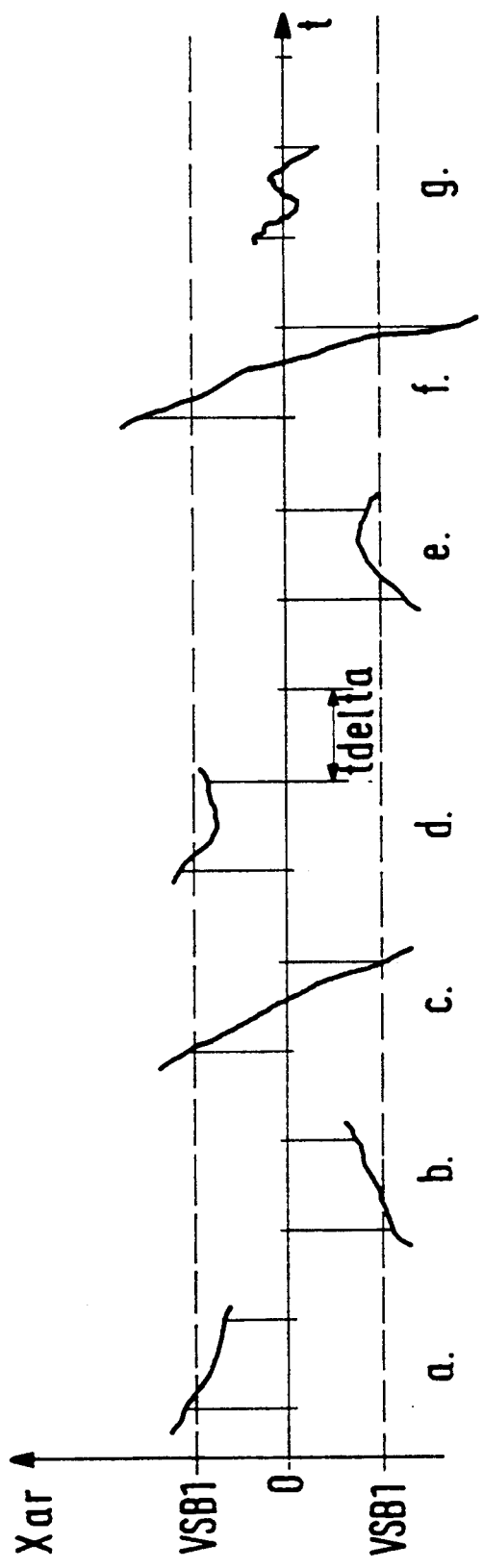
FIG. 2 is a diagram illustrating the inventional system.

The decision whether the compression or the traction demand will be relayed to the shock absorber now requires additional logical interrogations. For better explanation of the switching criteria of switch 11, FIG. 2 shows in exemplary fashion various shock absorber piston movements. To that end, the shock absorber piston velocity Xar′ is plotted over the time t.

If the condition 3' is now met for the first time, that is, the measured shock absorber piston velocity resides within the switch band VSB1, the shock absorber piston velocity passes the switch band VSB1 for the first time, and the actually measured shock absorber piston velocity is greater than zero (traction stage, by convention), the compression stage demand is relayed to the shock absorber. If the actually measured shock absorber piston velocity is smaller than zero (compression stage, by convention), the compression stage demand is relayed to the shock absorber.

Serving as another plausibility test is the query of the mathematical sign of the shock absorber piston acceleration Xar″(t). If the measured shock absorber piston velocity enters the switch band VSB1 with a positive sign, that is, "from above" in FIG. 2, the shock absorber piston acceleration Xar″(t) must be negative so that the shock absorber will be changed over. But if the measured shock absorber piston velocity enters the switch band with a negative sign, that is, "from below" as illustrated in FIG. 2, the shock absorber piston acceleration must be positive so that the shock absorber will be changed over.

This will be more clearly explained now with the aid of the examples a through illustrated in FIG. 2. For that purpose, two measured values each of the measured shock absorber piston velocity Xar′(t) are plotted, per example, which are determined within a scanning cycle tdelta.

In the example a, the condition 3' is met at the end of the scanning cycle considered, that is, the shock absorber piston velocity resides for the first time within the switch band. The measured shock absorber piston velocity has a positive sign (meaning "entering from above") and the determined shock absorber piston acceleration is negative. In the case of example a, the switch 11 is so controlled that the compression stage demand will be relayed to the shock absorber.

In the present example b, the measured shock absorber piston velocity enters the switch band within a scanning cycle "from below." The determined shock absorber piston acceleration being positive, the switch 11 is so activated that the traction stage demand will be relayed to the shock absorber.

Since also in the case of example c the shock absorber piston velocity passes the positive switch band limit relevant to the traction stage of the last scanning step, and the acceleration of the shock absorber piston is negative, the compression stage demand is relayed to the shock absorber also in this case.

In the case of example d, the shock absorber piston velocity, according to its sign, enters the switch band "from above," and since the determined shock absorber piston acceleration has a positive value, no changeover will take place.

No changeover is carried out in the equivalent case of example e, since here the shock absorber piston acceleration is negative and the shock absorber piston velocity also has a negative value.

In a further development of the embodiment, the computation of the switch band occurs for reasons of the limited signal quality of the shock absorber piston acceleration in a way somewhat different than described above. Based on an acceleration-independent fixed switch band share VSBo, the switch band expands linearly with an increasing acceleration by [Xar″*Kappa]. The factor Kappa serves to weight the acceleration contingence and should range, dependent on the signal quality of the shock absorber piston acceleration, in the value range between 0 and 1. The pure switch valid at Kappa=1 band calculation described above should be thus, obtained as a new switch band is $$VSB2 = VSBo + [Xar'' * tau * Kappa] \quad (4)$$

with $$VSBo = (1-Kappa) * Ao * tau. \quad (5)$$

The constant Ao should be so selected that with Kappa=0, a switch band will be obtained that equals in size ½ the noise band of the measured shock absorber piston velocity. The lead time tau is computed according to equation 1, using for the value tdr the time needed for the desired change of the damping characteristic. In the process, the actual direction of movement of the shock absorber is also to be allowed for.

A further development of the present inventional system according to this embodiment provides for the introduction of an acceleration dead band ADB. To avoid changes of the damping characteristics at quick wheel movements, any changeover of shock absorber piston accelerations which by amount are greater than an acceleration dead band ADB will be suppressed. In example f, shown in FIG. 2, the acceleration is excessive; it lies outside the band ADB. Thus, no changeover will take place.

To avoid excessive noise of the acceleration signal, the differentiator of the second means (13) should have the character of a sufficiently damped low pass which, however, must not lead to making the phase reversal in the relevant frequency range excessive. The latter is to be seen before the backdrop of the plausibility test of the acceleration as the shock absorber velocity enters the switch band.

According to the present inventional system, not only is the momentarily measured shock absorber piston velocity thus utilized for the switching decision of the switch 11, but also the development of that velocity through a threshold which is dependent on the shock absorber piston acceleration.

The thresholds can be adapted to the shock absorber switching times for various adjustments of the damping characteristic and for various shock absorber piston velocities.

In addition to the contingencies of the delay time tau described in equation 1, the value of tau may be chosen as a tuning parameter as regards the minimization of the noise in changing the damping characteristics. A timely changeover through the inventional system minimizes damping force transients and thus noise.

The random changeover of the shock absorber at low shock absorber piston velocities is thus precluded. This can be seen on the example g relative to FIG. 2. Here, no changeovers are carried out, since the differences of the shock absorber piston velocities are so small that they reside within the switch band. Avoiding the changeover at low shock absorber piston velocities prolongs the service life of the shock absorber.

The sensitivity to noise of the present inventional system is low, since for the switching decision it is necessary that a surmounting of the threshold in a certain direction and a plausible acceleration coincide.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A system for control of a vehicle chassis, the vehicle including a body and at least one wheel unit, said system comprising:

at least one damper having opposite ends and an adjustable damping characteristic, one of said ends connected to said body and the other of said ends connected to at least one said wheel unit;

sensor means generating a first signal representing a relative velocity between said damper ends;

first means, for receiving said first signal, and for generating a second signal representing a relative acceleration between said damper ends, said second signal dependent on said first signal;

second means, for receiving said first signal and said second signal, and for determining a first threshold dependent on one of said first and second signals, comparing an other of said first and second signals with said first threshold, and generating a third signal dependent on said comparison; and third means, for receiving said third signal, and for effecting a changeover of said adjustable damping characteristic of said damper, only when said third signal corresponds to one of at least one specified value.

2. The system according to claim 1, wherein the sensor means comprises sensors capturing shock absorber spring deflection movements, the deflection movements corresponding to at least one of spring deflection travel, spring deflection velocity, and pressure differences in the shock absorber.

3. The system according to claim 1, wherein the first threshold is dependent on signal noise.

4. The system of claim 1, wherein said third means comprises a controllable switch providing an actuation signal to said damper.

5. The system according to claim 1, wherein the first thresholds are dependent upon an amount of linkage of a multiplicative linkage of the second signal value with a variable (tau) that is dependent on shock absorber dynamics, computer running time, and the first signal, the first threshold also being dependent upon at least one of signal integrity of the second signal, signal integrity of the first signal, and a tuning parameter as regards the minimization of switching noises as the damping characteristics are changed.

6. The system according to claim 5, further comprising means for comparing the second signal with second thresholds ($\pm$ADB), and wherein said changeover is effected only if the value of the second signal is smaller than the value (ADB) representing the second threshold.

* * * * *